(12) United States Patent
Yamashita

(10) Patent No.: US 10,795,423 B2
(45) Date of Patent: Oct. 6, 2020

(54) ELECTRONIC APPARATUS WITH POWER SAVING MODE, CONTROL METHOD THEREOF, AND STORAGE MEDIUM

(71) Applicant: CANON KABUSHIKI KAISHA, Tokyo (JP)

(72) Inventor: Takahiro Yamashita, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 15/422,896

(22) Filed: Feb. 2, 2017

(65) Prior Publication Data

US 2017/0228008 A1 Aug. 10, 2017

(30) Foreign Application Priority Data

Feb. 10, 2016 (JP) .................................. 2016-024071

(51) Int. Cl.
*G06F 1/3218* (2019.01)
*G06F 1/3287* (2019.01)
(Continued)

(52) U.S. Cl.
CPC .......... *G06F 1/3218* (2013.01); *G06F 1/3234* (2013.01); *G06F 1/3287* (2013.01); *G06F 9/4401* (2013.01)

(58) Field of Classification Search
None
See application file for complete search history.

(56) References Cited

U.S. PATENT DOCUMENTS 7,537,163 B2 5/2009 Kikuta
2005/0114486 A1* 5/2005 Obert .................. G06F 11/0733
709/223
(Continued)

FOREIGN PATENT DOCUMENTS

CN 103677867 3/2014
CN 103970560 8/2014
JP 2007-148594 A 6/2007

OTHER PUBLICATIONS

CN Office Action dated Nov. 1, 2019 in counterpart CN Application No. 201710070535.X with English translation.
(Continued)

*Primary Examiner* — Kim Huynh
*Assistant Examiner* — Joshua Neveln
(74) *Attorney, Agent, or Firm* — Venable LLP

(57) ABSTRACT

An electronic apparatus having a function to omit part of initialization processing that is performed at the time of cold boot by using information held in a volatile storage device in returning from a power-saving state where power consumption is suppressed includes: a determination unit configured to determine, based on information indicating a connection state of a specific module of all the modules, whether to suspend supply of power to all modules of the electronic apparatus or to make a transition into the power-saving state where supply of power to at least the volatile storage device is maintained in response to an operation to turn off a power source by a user; and a power source control unit configured to control supply of power to each module of the electronic apparatus in accordance with the determination, and in activation processing in accordance with the function, part of initialization processing of the specific module is omitted.

27 Claims, 6 Drawing Sheets

(51) Int. Cl.
*G06F 1/3234* (2019.01)
*G06F 9/4401* (2018.01)

(56) References Cited

U.S. PATENT DOCUMENTS

| | | | |
|---|---|---|---|
| 2006/0282654 A1* | 12/2006 | Veen | G06F 9/4418 |
| | | | 713/1 |
| 2007/0119937 A1 | 5/2007 | Kikuta | 235/462.3 |
| 2012/0272048 A1* | 10/2012 | Yokoyama | G06F 1/263 |
| | | | 713/1 |
| 2014/0223159 A1 | 8/2014 | Lin et al. | 713/2 |
| 2015/0039937 A1* | 2/2015 | Yamashita | G06F 11/0721 |
| | | | 714/10 |
| 2016/0036596 A1* | 2/2016 | Fukushima | H04L 12/12 |
| | | | 370/241 |

OTHER PUBLICATIONS

CN Office Action dated May 21, 2020 in counterpart CN Application No. 201710070535.X with English translation.

\* cited by examiner

ELECTRONIC APPARATUS WITH POWER SAVING MODE, CONTROL METHOD THEREOF, AND STORAGE MEDIUM

BACKGROUND OF THE INVENTION

Field of the Invention

The present invention relates to an electronic apparatus including a function to return fast from a power-saving state.

Description of the Related Art

An electronic apparatus in recent years has an operation mode (power-saving mode) in which power consumption is suppressed by omitting energization of circuits apart from a normal power state. In this case, the transition from the normal power state into the power-saving state is performed by processing not being performed for a fixed period of time in the apparatus as a trigger. As a method of controlling the transition of the power state, the method has been proposed in which the connection state of a print data transfer cable of an image forming apparatus is monitored and in the case where there is a change in the connection state, a transition is made into the normal power state from the power-saving state (see Japanese Patent Laid-Open No. 2007-148594).

Further, among the electronic apparatuses having the power-saving mode, some apparatuses have a resume function to implement a fast return to the normal power state by holding, in response to shutdown instructions of a user, the contents of various settings or the like at the point in time of the instructions in a memory with slight power consumption. With this resume function, by using the contents of the various settings or the like held in the memory, it is possible to omit part of initialization processing at the time of the next activation. Due to this, a faster return is implemented compared to the processing to load programs into a memory from an auxiliary storage device (HDD, SSD, etc.) and a so-called cold boot accompanied by the initialization of all the devices.

In the electronic apparatus having the resume function as described above, the circuit whose energization is shut off by shutdown instructions can be used again by performing the initialization at the time of the next activation. However, in the case where the electronic apparatus includes a module, such as a display, which is connected, for example, by a cable or the like, it may happen that the time required for the state transition can be reduced by omitting part of the initialization processing of the module at the time of the next activation. For example, in the case where the image forming apparatus includes a display for UI, at the time of the next activation, only the GPU (Graphic Processing Unit) for control is initialized and the acquisition of the information, such as the display resolution, which requires communication via a cable is omitted. The reason is that, for example, the UI display of the image forming apparatus is limited to a specific model type and the necessity to acquire the information on the resolution thereof or the like each time the activation processing is performed is low. That is, a reduction in the activation time and a reduction in resource consumption are implemented by acquiring information unique to the UI display only at the time of cold boot and by omitting the monitoring processing of attachment/detachment of a cable by also using the already acquired information while the resume function is made use of.

Here, it is assumed that the cable that connects the UI display is disconnected for some reason in the image forming apparatus having the above-described resume function. In the case where shutdown instructions are given in this state and the transition is made into the power-saving state on the premise of the resume function, despite the state where the UI display cannot be used, the acquisition of necessary information is omitted at the time of the next activation. As a result of this, the activation processing makes progress in the abnormal state where the UI display is not connected and a situation will be brought about where it is not possible to use the image forming apparatus normally. Such a problem is not limited to the image forming apparatus that is connected with the UI display via a cable and may occur in various electronic apparatuses having the same configuration. Consequently, an object of the present invention is to prevent the activation processing from being performed in the state where part of modules cannot be controlled in an electronic apparatus including a function to return fast from the power-saving state.

SUMMARY OF THE INVENTION

The electronic apparatus according to the present invention is an electronic apparatus having a function to omit part of initialization processing that is performed at a time of cold boot by using information held in a volatile storage device in returning from a power-saving state where power consumption is suppressed, and includes: a determination unit configured to, based on information indicating a connection state of a specific module of all the modules, determine whether to suspend supply of power to all modules of the electronic apparatus or to make a transition into the power-saving state where supply of power to at least the volatile storage device is maintained in response to an operation to turn off a power source by a user; and a power source control unit configured to control supply of power to each module of the electronic apparatus in accordance with the determination, and in activation processing in accordance with the function, part of initialization processing of the specific module is omitted.

Further features of the present invention will become apparent from the following description of exemplary embodiments (with reference to the attached drawings).

DESCRIPTION OF THE EMBODIMENTS

In the following, with reference to the attached drawings, embodiments for embodying the present invention are explained. The configurations shown in the following embodiments are merely exemplary and the present invention is not limited to the configurations shown schematically. In the following, explanation is given by taking a relationship between an image forming apparatus (MFP: Multi Function Peripheral) having a plurality of functions, such as functions as a printer, a scanner, and a FAX, and a BOX save function, and a UI display thereof as an example. However, the present invention is not limited to the configuration such as this. It is possible to widely apply the present invention to an apparatus having a configuration in which the initialization processing of all the modules is performed only at the time of cold boot and at the time of activation in accordance with the resume function, part of the initialization processing of a specific module is omitted.

First Embodiment

Figure 1:
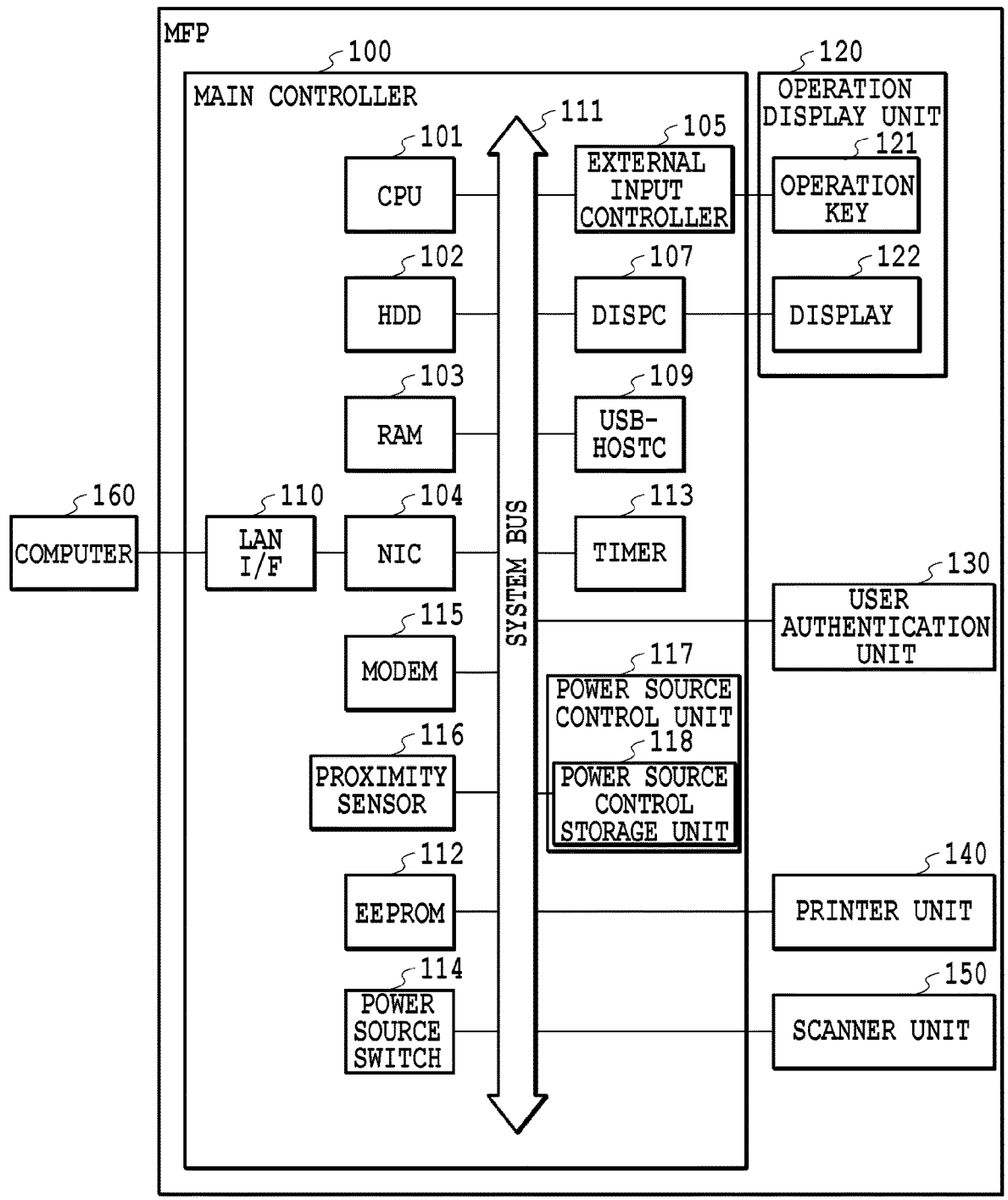
FIG. 1 is a block diagram showing a hardware configuration of an MFP.

FIG. 1 is a block diagram showing a hardware configuration of an MFP according to the present embodiment. The MFP shown in FIG. 1 includes a main controller 100, an operation display unit 120, a user authentication unit 130, a printer unit 140, and a scanner unit 150. The main controller 100 includes a CPU 101 and the CPU 101 centralizedly controls each processing unit connected to a system bus 111 in accordance with a specified command set and an input value. An HDD 102 is a nonvolatile large-capacity storage device and in the HDD 102, various programs that are executed by the CPU 101 and data are stored. Specifically, data of an OS (Operating System), a boot loader for selecting the OS, firmware for implementing/controlling each function, a file system for efficiently managing files, etc., is saved. A RAM 103 is a volatile storage device and is used as a main memory, a work area, etc., of the CPU 101. The various programs saved in the HDD 102 are loaded into the RAM 103 and executed by the CPU 101 interpreting and processing the programs. An NIC 104 means a network interface card and performs bidirectional communication of data with another network device, such as a computer 160 and a file server (not shown schematically), via a LAN I/F 110. Energization of the NIC 104 is maintained even in the power-saving state and by means of a processor and a memory (not shown schematically) included inside thereof, it is possible to perform communication processing even in the case where supply of power to the CPU 101 is suspended.

The operation display unit 120 includes an operation key 121 for a user to input various operation instructions and a display 122 to display necessary information. It may also be possible for the display 122 having a touch panel function to also have a function as the operation key 121. An external input controller 105 performs detection and control of the input of instructions from the operation key 121. A DISPC 107 means a display controller and controls the display 122. The DISPC 107 and the display 122 are connected to each other by a video signal cable, for example, such as an HDMI (registered trademark) (High Definition Multimedia Interface) cable. It is possible for the CPU 101 to know the connection state of the display 122 via the DISPC 107. A USB-HOSTC 109 means a USB host controller and is capable of connecting a storage device and a device including a USB interface, such as an IC card reader. An EEPROM 112 is a small-capacity nonvolatile memory in which data can be rewritten and in the EEPROM 112, setting information on the MFP or the like is stored. A timer 113 includes a secondary battery and times an elapsed time from a reference time at all times and at the same time measures an elapsed time in response to instructions from the CPU 101. A power source switch 114 is a switch that causes a control signal (on or off) of supply of power to the CPU 101 to occur. A modem 115 is connected to a public line and performs communication with an external device via the public line and performs transmission/reception processing of facsimile data. A proximity sensor 116 is a sensor that detects whether or not a user comes close to the MFP by using infrared or the like. A power source control unit 117 performs power control of the MFP and stores information about the power source control in a power source control storage unit 118 included inside thereof. The user authentication unit 130 reads identification information on a user from an ID card or the like by using, for example, an NFC (Near Field Communication) technique and performs authentication processing of a user right. The printer unit 150 is a printing processing unit configured to print an image on a printing medium, such as paper, by a method, such as the electrophotographic method and the ink jet method, in accordance with image data to be printed. The scanner unit 140 is a read processing unit configured to optically read a document that is set on a document table, not shown schematically.

Figure 2:
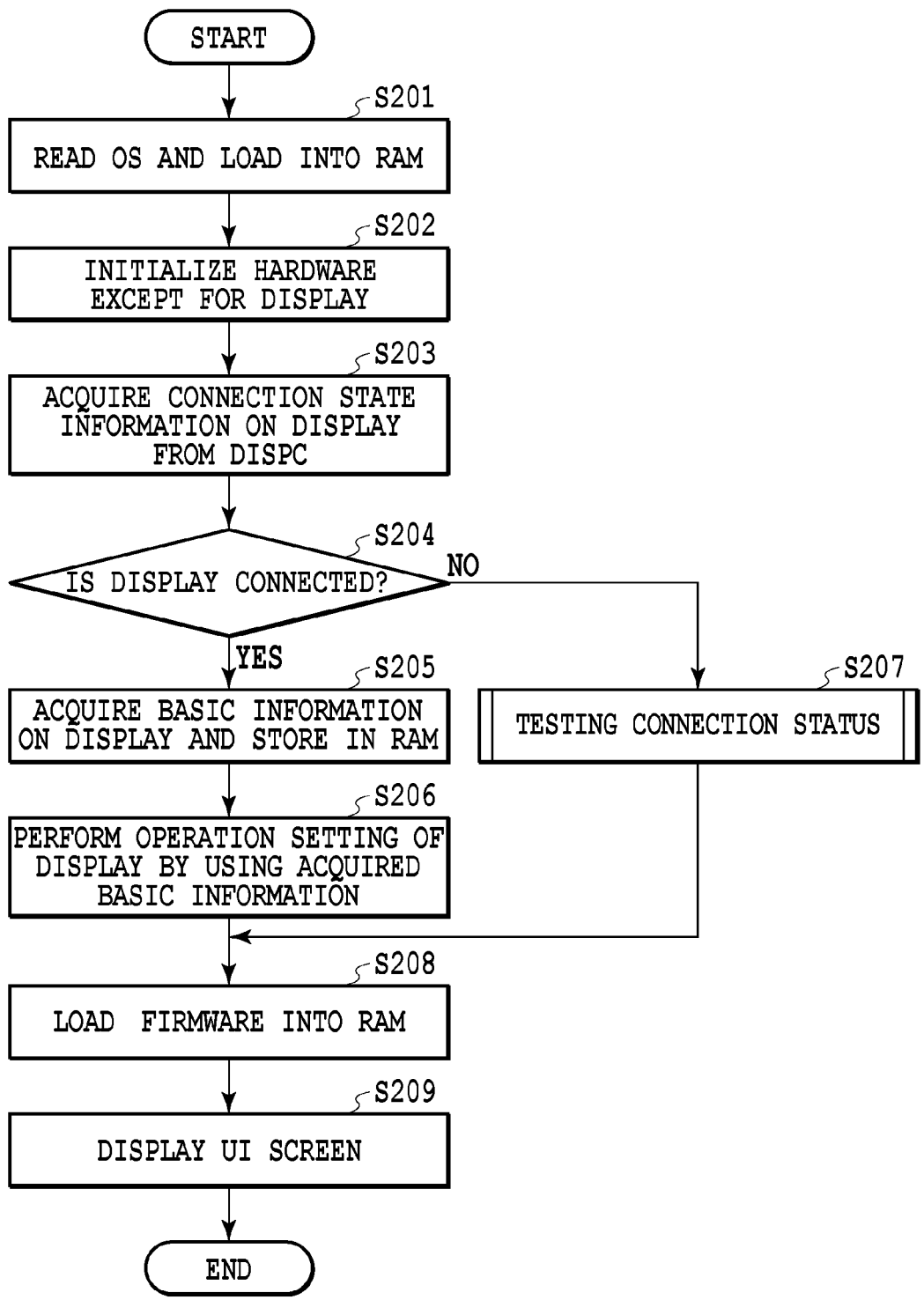
FIG. 2 is a flowchart showing a flow until a UI screen is displayed on a display at the time of cold boot.

Subsequently, control until a screen (UI screen) for a user operation is displayed on the display 122 by activation processing (cold boot) from a state where the power source is perfectly shut off is explained. FIG. 2 is a flowchart showing a flow until a UI screen is displayed on the display at the time of cold boot. This flow is performed in the case where the power source switch 114 is operated (operation to turn on the power source) by a user in the state where supply of power to all the modules included in the MFP is suspended. The display used in the MFP is a display different from that of a common PC and is not exchanged with a display of different type during the use and the display that can be used is limited. Consequently, as the basic information necessary for the operation setting of the display 122, such as the resolution, that which is acquired at the time of cold boot is held as it is and used for the activation processing from the power-saving state (part of the initialization processing is omitted), and thus a resume is implemented.

First, at step 201, the OS is read from a predetermined address of the HDD 102 and loaded into the RAM 103. Subsequently, at step 202, by each device driver included in the OS, the initialization processing of the hardware except for the display 122 is performed. For example, a USB host driver performs the register setting of the USB-HOSTC 109 to make it possible to recognize an inserted USB device. Further, a network driver performs the register setting of the NIC 104 and receives a network packet from a file server, not shown schematically, and determines whether a LAN cable is connected to the LAN I/F 110.

Subsequently, at step 203, information (e.g., a signal indicating whether the HDMI cable is connected by two values) indicating the connection state of the display 122 is acquired from the DISPC 107. Then, at step 204, by using the connection state information acquired at step 203, whether the display 122 is connected is determined. In the case where it is determined that the display 122 is connected, the processing advances to step 205. On the other hand, in the case where it is determined that the display 122 is not connected, the processing advances to step 207.

At step 205, the basic information about the display 122 is acquired and saved in the RAM 103. In the present embodiment, as the basic information, EDID (Extended Display Identification Data) is acquired from the display 122. In the EDID, information, such as a refresh rate, resolution, manufacturing maker, model type, serial number, and a corresponding power source management function, is described. By holding the basic information such as this about the display in the RAM 103, it is possible to immediately perform the operation setting by omitting the acquisition of the basic information in the activation processing from the power-saving state.

At step 206, by using the acquired basic information, the operation setting of the display 122 is performed. On the other hand, at step 207, processing to check the connection situation of the display 122 (in the case where the display 122 is not connected, processing to record this fact) is performed. Details of this testing connection status will be described later. Then, by each piece of processing hitherto, it is made possible to use each hardware block of the MFP.

At step 208, the firmware for implementing each function of the MFP is read from the HDD 102 and loaded into the RAM 103. By this firmware, for example, the printing function, i.e., the printing processing to form an image on a printing medium, such as paper, after converting print data received via the LAN into a data format that can be made use of by the printer unit 140 is implemented.

At step 209, by the firmware, the UI screen data for the user operation is read from the HDD 102 and supplied to the display 122 via the DISPC 107, and then the UI screen is displayed on the display 122. Here, it is needless to say that the UI screen is not drawn normally on the display 122 in the case where the initialization processing of the display 122 has not been performed at step 206.

In the flow in FIG. 2, even in the case where the display 122 is not connected, the subsequent processing is continued after recording this fact. The reason the control such as this is performed is that a configuration is supposed in which the UI screen is also displayed on the monitor of the computer 160 via the LAN I/F 110 so that it is possible for a user to give instructions to perform various operations to the MFP. Consequently, in the case where there is no unit configured to display the UI screen other than the display 122, it may also be possible to notify a user of the fact at the point in time of finding that the display 122 is not connected and to perform error processing or the like.

The above is the flow until the UI screen is displayed on the display at the time of cold boot. As described above, in the activation processing from the state where the power source is perfectly shut off, the initialization processing of all the modules including the display 122 is performed. Then, for the display 122, the operation setting is performed by acquiring the basic information thereof and at the same time, the acquired basic information is held as it is.

<Testing Connection Status>

Figure 3:
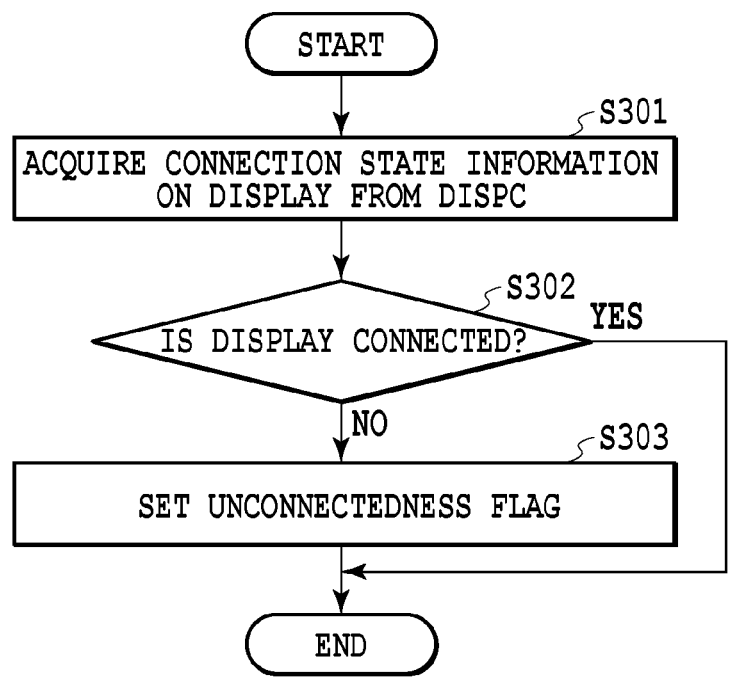
FIG. 3 is a flowchart showing details of testing connection status.

Subsequently, the testing connection status (step 207) is explained. FIG. 3 is a flowchart showing details of the testing connection status. At step 301, information indicating the connection state of the display 122 is acquired from the DISPC 107. Then, at step 302, by using the acquired connection state information, whether the display 122 is connected is determined. In the case where it is determined that the display 122 is not connected, the processing advances to step 303. At step 303, the information indicating the fact of unconnectedness is recorded in the RAM 103. Here, as the information indicating the fact of unconnectedness, mention is made of, for example, a flag (hereinafter, "unconnectedness flag") represented by two values, ON or OFF. On the other hand, in the case where it is determined that the display 122 is connected, the present processing is exited. The above is the contents of the testing connection status.

As described above, in the present embodiment, the configuration is supposed in which the UI screen is also displayed on the monitor of the computer 106, in addition to the display 122. Further, there may a situation where even in the case where the display 122 is connected normally at the point in time of cold boot described above, the unconnected state is entered because the HDMI cable comes off for some reason afterward. Consequently, control is performed so as to check and record the connection situation of the display 122 by performing the above-described testing connection status not only at the time of cold boot but also at predetermined timing during activation. It may also be possible to implement the predetermined timing by, for example, periodic polling, or in the case where a circuit that is notified of a change in the connection state by interrupt processing from the DISPC 107 is used, it may also be possible to perform the testing connection status within the interrupt handler.

The unconnectedness flag that is set by this testing connection status is referred to in shutdown control processing, to be described later. The unconnectedness flag is volatile information that is cleared by the suspension of power source supply and it is only required to be able to record the fact that the unconnected state has been entered at least once after the activation. Consequently, after the unconnectedness flag is set at a certain point in time, it is not necessary to perform the testing connection status until the power source supply is suspended the next time. In the case where the testing connection status is performed in the cold boot stage, the processing at steps 301 and 302 is a duplication of that at steps 203 and 204 in the flow in FIG. 2. Consequently, it may also be possible to omit steps 301 and 302 and to immediately set the unconnectedness flag.

Figure 4:
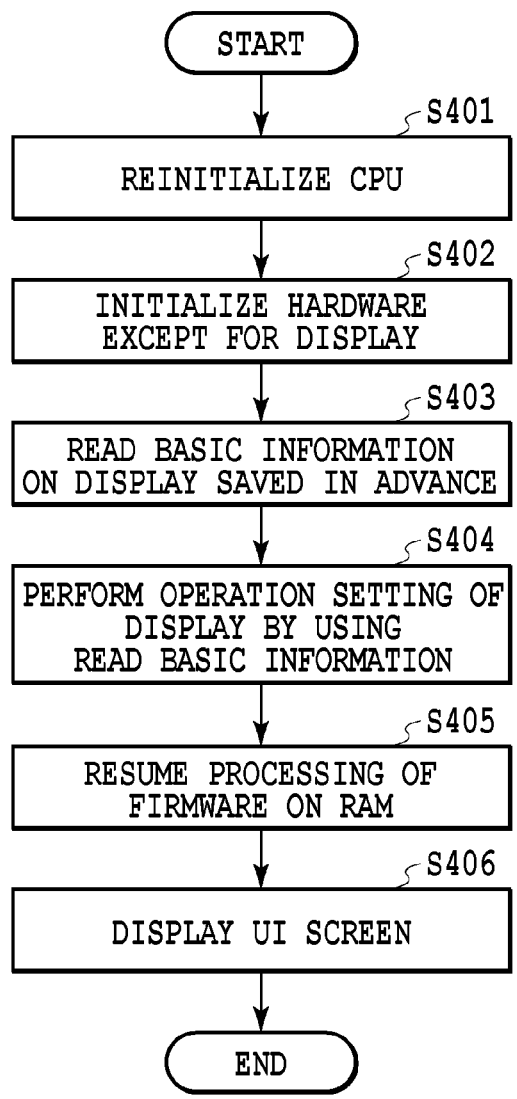
FIG. 4 is a flowchart showing a flow of activation processing by a resume function.
Figure 5:
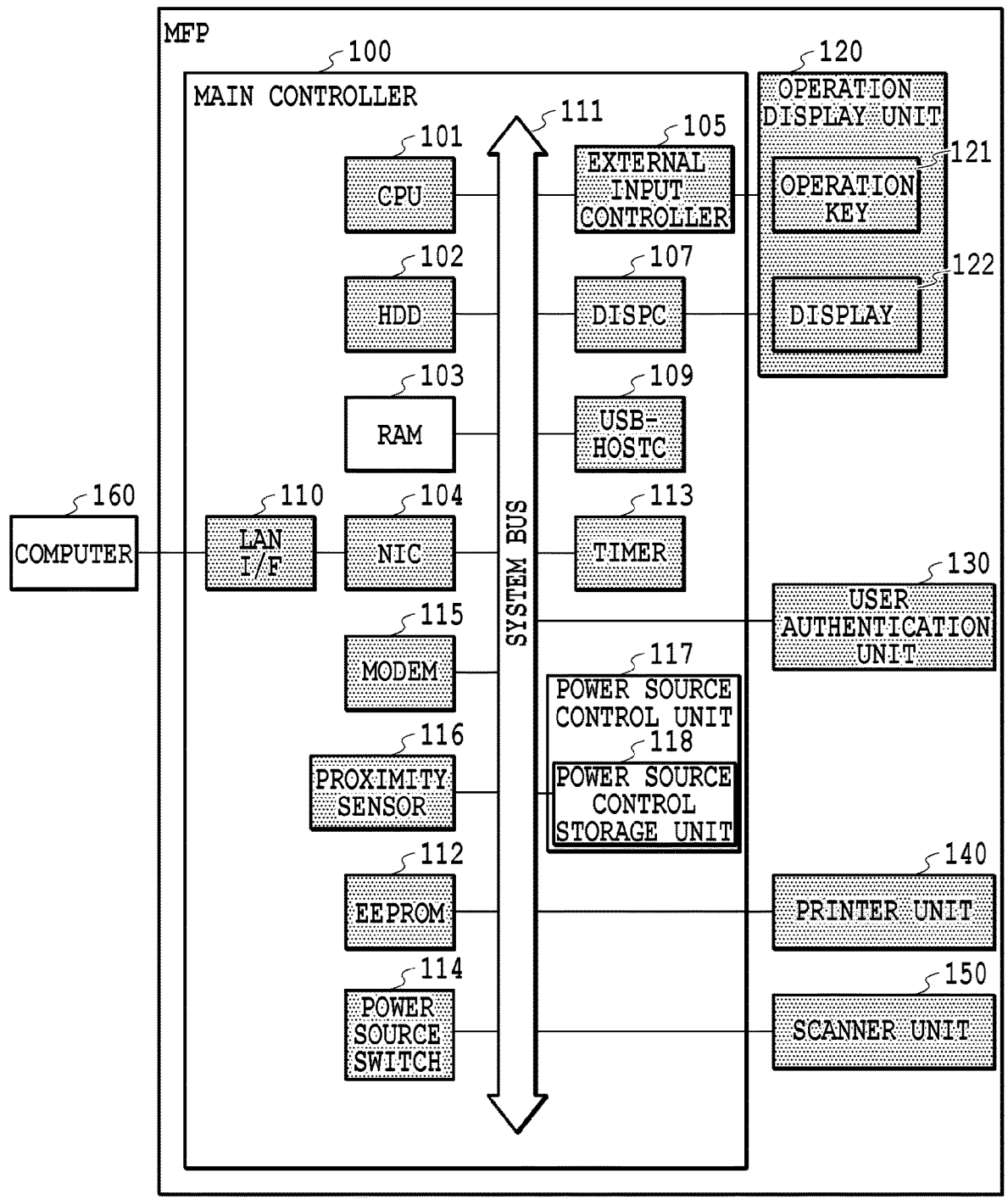
FIG. 5 is a diagram showing an energized state in a power-saving state of an MFP.

Subsequently, activation processing in accordance with the resume function (transition into the normal power state from the power-saving state) is explained. FIG. 4 is a flowchart showing a flow of the activation processing in accordance with resume function. The power-saving state referred to here is a state generally called STR (Suspend to RAM), i.e., a state where supply of power to the other units is suspended while keeping the system state by maintaining energization of the RAM 103. FIG. 5 is a diagram showing an energized state in the power-saving state of the MFP according to the present embodiment. In FIG. 5, the block shown in gray is the portion not energized and for the circuit of the gray portion, the initialization processing is necessary at the time of making a transition into the normal power state. In this power-saving state, triggered by the power source switch 114 being operated (operation to turn ON the power source), the activation processing shown in this flow is performed. It is premised that the basic information on the display 122 is saved in the RAM 103 by the flow shown in FIG. 3 described previously at the time of the execution of the activation processing shown in this flow. Due to this, it is possible to make a transition into the normal power state in a short time by omitting the acquisition of the basic information on the display 122.

First, at step 401, the reinitialization processing of the CPU 101 is performed. Specifically, the processing to perform the setting again to enable the multicore operation, the processing to write back the setting value having been withdrawn in the RAM 103, etc., are performed. Subsequently, at step 402, the initialization processing of the hardware except for the display 122 is performed. It may also be possible to perform this initialization processing from zero as in the case of cold boot, or to use the setting value or the like, if any, saved in the RAM 103 in advance.

At step 403, the basic information on the display 122 is read from the RAM 103. Then, at step 404, by using the read basic information, the operation setting of the display 122 is performed. Further, at step 405, the processing of the firmware saved on the RAM 103 is resumed. Due to this, a state is brought about where the functions of the firmware can be used, including the printing processing to form an image on a printing medium.

At step 406, by the firmware, the UI screen data is read from the RAM 103 and drawn on the display 122.

The above is the contents of the activation processing in accordance with the resume function. As described above, at the time of returning from the power-saving state, the acquisition of the EDID, which is part of the initialization processing of the display 122, is omitted.

In the above-described activation processing in accordance with the resume function, in the case where the basic information on the display 122 is not held in the RAM 103, it is not possible to normally perform the operation setting of the display 122. In order to eliminate this situation, it is necessary to perform the processing (full shutdown processing) to suspend the supply of power to all the processing blocks shown in FIG. 1 to completely turn off the power source once, and then to perform the initialization processing again from the cold boot the next time. Because of this, in the present embodiment, in response to the operation to turn off the power source (shutdown instructions) of a user, first, whether the basic information on the display 122 is held in the RAM 103 is checked. Then, in the case where the basic information is not held, control is performed so that the full shutdown processing is performed in place of the transition processing into the power-saving state which premises the resume function.

Figure 6:
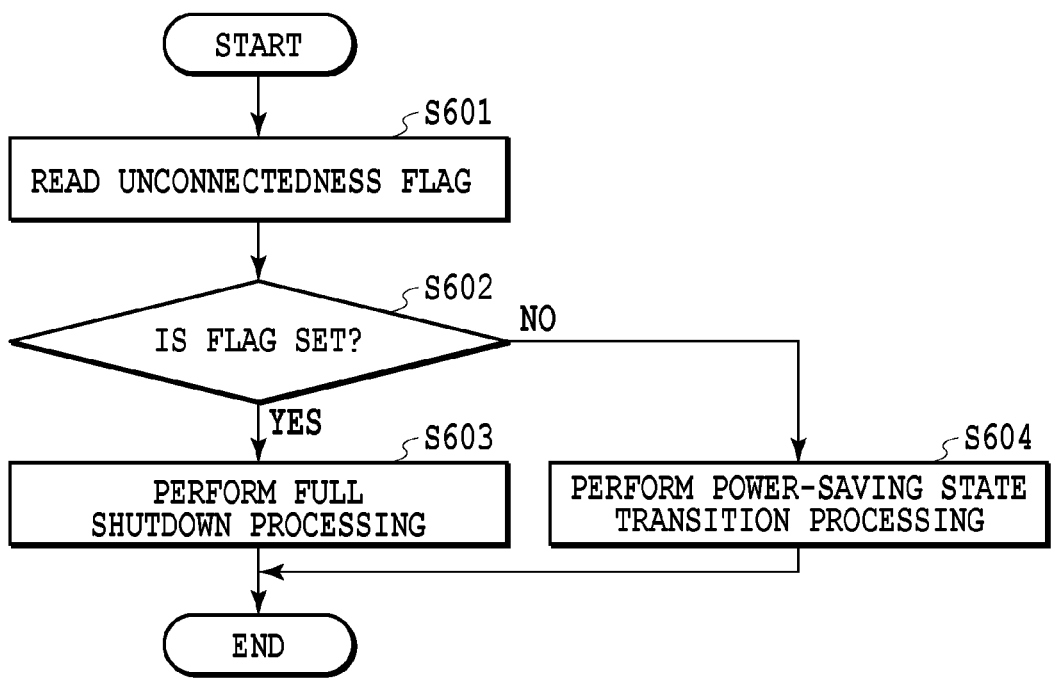
FIG. 6 is a flowchart showing a flow of power source control in the case where shutdown instructions are given.

FIG. 6 is a flowchart showing a flow of the power source control in the case where the shutdown instructions are given. This flow is implemented by the CPU 101 executing a predetermined control program in response to, for example, occurrence of an OFF interrupt signal due to the operation of the power source switch 114 (operation to turn off the power source) in the normal power state.

At step 601, the unconnectedness flag is read from the RAM 103. At step 602 that follows, the processing is branched depending on whether the unconnectedness flag is set. In the case where the unconnectedness flag is set and the read has succeeded, the processing advances to step 603 and in the case where the unconnectedness flag is not set and the read has failed, the processing advances to step 604.

At step 603, instructions to perform the full shutdown processing are given to the power source control unit 117. In the full shutdown processing, after the data of the data held in the RAM 103, which is still necessary (user data, such as print data, and setting value), is saved in a nonvolatile area, such as the HDD 102, the supply of power to all the units within the MFP is suspended. The data on the RAM 103 other than the data saved in the HDD 102 is lost by the suspension of the supply of power. Due to this, in the activation processing accompanying the operation of the power source switch 114 the next time (operation to turn on the power source), the cold boot is performed. Consequently, in the case where the display 122 is connected correctly at the point in time of the operation to turn on the power source, the abnormal state is eliminated by the initialization processing accompanying the cold boot, specifically, by the acquisition of the basic information about the display 122 and the execution of the operation setting using the basic information.

At step 604, instructions to perform the transition processing into the power-saving state on the premise of the resume function are given to the power source control unit 117. In this transition processing, the supply of power to the circuits other than part of the circuits, such as the RAM 103 whose energization is maintained, is suspended. Consequently, after the setting information or the like on the circuits whose energization is no more maintained is read and saved in the RAM 103, the supply of power to the remaining circuits is suspended. Due to this, at the time of the operation of the power source switch 114 the next time (operation to turn on the power source), the activation processing to return the normal state fast is performed by using the data held in the RAM 103.

The above is the contents of the power source control in the case where the shutdown instructions are given. In the flow in FIG. 6, whether the power-saving state transition processing is performed or the full shutdown processing is performed is determined only by the presence/absence of the setting of the unconnectedness flag. However, the determination reference is not limited to the presence/absence of the setting of the unconnectedness flag. For example, despite that the setting of the unconnectedness flag is performed, in the case where the UI screen data is provided to the computer 160 via the LAN I/F 110, it may also be possible to perform control so as to perform the power-saving state transition processing by determining that the input operation using the computer 160 is possible.

As described above, in the present embodiment, in the case where the shutdown instructions of a user are given, based on the flag indicating the connection situation of the UI display, whether the power-saving state transition processing on the premise of the resume function is performed or the full shutdown processing is performed is determined. Then, in the case where the flag is set, the full shutdown processing is performed in place of the power-saving state transition processing. Due to this, it is possible to prevent the activation processing in accordance with the resume function from being performed at the time of the operation to turn on the power source the next time and to prevent the MPF from activating without the fact of the abnormality being grasped despite the abnormal state where the UI display is not connected.

As described above, according to the invention of the present embodiment, in an electronic apparatus including a function to return fast from a power-saving state, it is possible to prevent activation processing by a resume function from being performed in a state where a specific module cannot be controlled and to prevent the fact of the abnormal state from being overlooked.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in an electronic apparatus including a function to return fast from a power-saving state, it is possible to prevent activation processing from being performed in a state where part of modules cannot be controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-024071, filed Feb. 10, 2016, which is hereby incorporated by reference wherein in its entirety.

What is claimed is:

1. An electronic system including a predetermined device, the electronic system comprising:
   a power controller that shifts a power state of the electronic system into a first off state based on a first setting in response to an OFF operation of a power source switch of the electronic system and a second off state based on a second setting in reponse to the OFF operation of the power switch, wherein the first off state has a lower power consumption than the second off state;
   a controller that performs first activation processing including at least acquisition processing for acquiring predetermined information on the predetermined device from the predetermined device at activation from the first off state, and performs second activation processing at least excluding the acquisition processing at activation from the second off state; and
   a storage for storing information indicating that the predetermined device is electrically unconnected,
   wherein, in a case where the information is stored in the storage, the power controller shifts the power state of the electronic system into the first off state in response to the OFF operation of the power source switch, and
   wherein, in a case where the information is not stored in the storage, the power controller shifts the power state of the electronic system into the first off state based on the first setting in response to the OFF operation of the power source switch and into the second off state based on the second setting in response to the OFF operation of the power source switch.

2. The electronic system according to claim 1, wherein the controller acquires a predetermined information from the predetermined device, determines whether the predetermined device is connected based on an acquisition result of the predetermined information, and stores the information in the storage in a case where it is determined that the predetermined device is unconnected.

3. The electronic system according to claim 2, wherein the controller determines whether the predetermined device is connected in the case of causing activation in the first off state.

4. The electronic system according to claim 2, wherein the controller periodically determines whether the predetermined device is connected.

5. The electronic system according to claim 2, wherein the controller determines whether the predetermined device is connected in a case where a connection state of the predetermined device changes.

6. The electronic system according to claim 2, further comprising a network interface for transmitting information to an external device,
   wherein in a case where the controller determines that the predetermined device is unconnected, the network interface transmits information for displaying predetermined information to a display of the external device.

7. The electronic system according to claim 6, wherein the predetermined information is information indicating that the predetermined device is unconnected.

8. The electronic system according to claim 1, wherein the predetermined device is a display.

9. The electronic system according to claim 1, wherein the acquisition processing is processing for acquiring EDID (Extended Display Identification Data) of the predetermined device from the predetermined device.

10. The electronic system according to claim 1, wherein the predetermined device is a display, and the acquisition processing is processing for acquiring at least one of a refresh rate, resolution, manufacturing maker, model type, serial number, and a power source management function of the display.

11. The electronic system according to claim 1, wherein at activation from the second off state, the controller performs an operation setting of the predetermined device by using the information on the predetermined device acquired at activation from the first off state.

12. The electronic system according to claim 1, further comprising a printing unit configured to print an image on a printing medium.

13. The electronic system according to claim 1, further comprising a reading unit configured to read a document.

14. A method for shifting a power state of an electronic system which includes a predetermined device, the method comprising:
   shifting a power state of the electronic system into a first off state or a second off state wherein the first off state has a lower power consumption than the second off state;
   performing first activation processing and second activation processing, wherein the first activation processing includes at least acquisition processing for acquiring predetermined information on the predetermined device from the predetermined device at activation from the first off state, and wherein the second activation processing at least excludes the acquisition processing at activation from the second off state; and
   storing information indicating that the predetermined device is unconnected,
   wherein, in a case where the information indicating an unconnected predetermined device is stored, shifting the power state of the electronic system into the first off state in response to an OFF operation of a power source switch of the electronic system, and
   wherein, in a case where the information is not stored in the storage, shifting the power state of the electronic system into the second off state in response to the OFF operation of the power source switch of the electronic system.

15. An electronic system including a predetermined device, the electronic system comprising:
   a power controller that shifts a power state of the electronic system into a first off state or a second off state wherein the first off state has a lower power consumption than the second off state;

a controller that performs first activation processing including at least acquisition processing for acquiring predetermined information on the predetermined device from the predetermined device at activation from the first off state, and performs second activation processing at least excluding the acquisition processing at activation from the second off state; and wherein, in a case where the predetermined device is unconnected, the power controller shifts the power state of the electronic system into the first off state in response to an OFF operation of a power source switch of the electronic system, and wherein, in a case where the predetermined device is connected, the power controller shifts the power state of the electronic system into the second off state in response to the OFF operation of the power source switch of the electronic system.

16. The electronic system according to claim 15, wherein the controller acquires a predetermined information from the predetermined device and determines whether the predetermined device is connected based on an acquisition result of the predetermined information.

17. The electronic system according to claim 16, wherein the controller determines whether the predetermined device is connected in the case of causing activation in the first off state.

18. The electronic system according to claim 16, wherein the controller periodically determines whether the predetermined device is connected.

19. The electronic system according to claim 16, wherein the controller determines whether the predetermined device is connected in a case where a connection state of the predetermined device changes.

20. The electronic system according to claim 16, further comprising a network interface for transmitting information to an external device, wherein in a case where the controller determines that the predetermined device is unconnected, the network interface transmits information for displaying predetermined information to a display of the external device.

21. The electronic system according to claim 20, wherein the predetermined information is information indicating that the predetermined device is unconnected.

22. The electronic system according to claim 15, wherein the predetermined device is a display.

23. The electronic system according to claim 15, wherein the acquisition processing is processing for acquiring EDID (Extended Display Identification Data) of the predetermined device from the predetermined device.

24. The electronic system according to claim 15, wherein the predetermined device is a display, and the acquisition processing is processing for acquiring at least one of a refresh rate, resolution, manufacturing maker, model type, serial number, and a power source management function of the display.

25. The electronic system according to claim 15, wherein at activation from the second off state, the controller performs an operation setting of the predetermined device by using the information on the predetermined device acquired at activation from the first off state.

26. The electronic system according to claim 15, further comprising a printing unit configured to print an image on a printing medium.

27. The electronic system according to claim 15, further comprising a reading unit configured to read a document.

* * * * *